United States Patent
Chen et al.

(10) Patent No.: US 10,179,854 B1
(45) Date of Patent: Jan. 15, 2019

(54) CHEMICALLY RESISTANT POLYCARBONATE-POLYESTER COMPOSITIONS, METHODS OF MANUFACTURE, AND ARTICLES THEREOF

(71) Applicant: SABIC GLOBAL TECHNOLOGIES B.V., Bergen op Zoom (NL)

(72) Inventors: Yagang Chen, Shanghai (CN); Bing Guan, Shanghai (CN); Lin Chen, Shanghai (CN); Dake Shen, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/079,883

(22) PCT Filed: Feb. 28, 2017

(86) PCT No.: PCT/IB2017/051172
§ 371 (c)(1),
(2) Date: Aug. 24, 2018

(87) PCT Pub. No.: WO2017/149457
PCT Pub. Date: Sep. 8, 2017

Related U.S. Application Data

(60) Provisional application No. 62/301,197, filed on Feb. 29, 2016.

(51) Int. Cl.
| | | |
|---|---|---|
| *C08L 69/00* | (2006.01) | |
| *C08J 3/20* | (2006.01) | |
| *C08J 5/18* | (2006.01) | |
| *C09D 169/00* | (2006.01) | |

(52) U.S. Cl.
CPC .............. *C08L 69/00* (2013.01); *C08J 3/201* (2013.01); *C08J 5/18* (2013.01); *C09D 169/00* (2013.01); *C08J 2369/00* (2013.01); *C08J 2423/08* (2013.01); *C08J 2433/08* (2013.01); *C08J 2433/10* (2013.01); *C08J 2467/02* (2013.01); *C08J 2471/02* (2013.01); *C08J 2483/10* (2013.01); *C08L 2203/12* (2013.01); *C08L 2203/14* (2013.01); *C08L 2203/16* (2013.01); *C08L 2205/025* (2013.01); *C08L 2205/035* (2013.01)

(58) Field of Classification Search
CPC ........ C08L 67/02; C08L 67/025; C08L 69/00; C08J 3/201; C08J 5/18; C09D 169/00
USPC .................. 524/506, 853; 525/92 A, 100
See application file for complete search history.

(56) References Cited

U.S. PATENT DOCUMENTS

| | | | |
|---|---|---|---|
| 4,857,604 | A | 8/1989 | Agarwal |
| 6,590,015 | B1 | 7/2003 | Eckel et al. |
| 6,723,864 | B2 | 4/2004 | Silva et al. |
| 2004/0039145 | A1 | 2/2004 | Silva et al. |
| 2011/0155975 | A1 | 6/2011 | Chakravarti et al. |
| 2013/0190425 | A1 | 7/2013 | Zhu et al. |
| 2013/0317150 | A1 | 11/2013 | Wan et al. |
| 2014/0295363 | A1 | 10/2014 | Sun et al. |
| 2015/0240074 | A1 | 8/2015 | Chen et al. |
| 2015/0368458 | A1 | 12/2015 | Sun et al. |

FOREIGN PATENT DOCUMENTS

| | | |
|---|---|---|
| EP | 0524731 A1 | 1/1993 |
| EP | 0992254 A2 | 4/2000 |
| WO | 2012058821 A1 | 5/2012 |
| WO | 2013175448 A1 | 11/2013 |
| WO | 2014072923 A1 | 5/2014 |

OTHER PUBLICATIONS

International Search Report for International Application No. PCT/IB2017/051172, International Filing Date Feb. 28, 2017, dated May 29, 2017, 5 pages.
Written Opinion for International Application No. PCT/IB2017/051172, International Filing Date Feb. 28, 2017, dated May 29, 2017, 6 pages.

*Primary Examiner* — Edward J Cain
(74) *Attorney, Agent, or Firm* — Cantor Colburn LLP

(57) ABSTRACT

A polymer composition includes 15 to 60 wt %, preferably 20 to 56 wt % of a polycarbonate; 30 to 60 wt %, preferably 28 to 50 wt % of a poly(1,4-cyclohexanedimethylene terephthalate); 0.05 to 35 wt %, preferably 0.1 to 30 wt % of a poly(carbonate-siloxane); 0.5 to 18 wt %, preferably 1 to 13 wt % of a thermoplastic poly(ester-ether) copolymer, preferably comprising poly(butylene terephthalate) blocks and poly(oxy$C_1$-$C_4$ alkylene units); and 0.5 to 8 wt % of ethylene-alkyl (meth)acrylate copolymer, wherein alkyl is a $C_1$-$C_4$ straight chain, unsaturated hydrocarbon group; wherein the weight percentages are based on the total weight of the polymer composition. A method of manufacturing an article including the steps of melt blending the components of the polycarbonate composition is described. An article prepared by the method is also described.

19 Claims, No Drawings

CHEMICALLY RESISTANT POLYCARBONATE-POLYESTER COMPOSITIONS, METHODS OF MANUFACTURE, AND ARTICLES THEREOF

CROSS REFERENCE TO RELATED APPLICATIONS

This application is a National Stage application of PCT/IB2017/051172, filed Feb. 28, 2017, which claims the benefit of U.S. Provisional Application No. 62/301,197, filed Feb. 29, 2016, both of which are incorporated by reference in their entirety herein.

BACKGROUND

Polycarbonate compositions are widely used as engineering thermoplastics in a wide variety of applications due to their good heat resistance, impact resistance, and transparency. However, in applications where the polycarbonate comes into direct contact with chemicals, in particular cleaning chemicals, such as in offices or kitchen appliances, the polycarbonate compositions can be subject to environmental stress cracking (ESC). Attempts to improve the chemical resistance of the compositions have included the incorporation of thermoplastic polyesters or other polymers into the compositions. However, chemical resistance of even these compositions does not meet more stringent requirements. It can further be difficult to obtain excellent chemical resistance while maintaining a good balance of processing and mechanical properties, for example flow and impact properties.

There accordingly remains a need in the art for polycarbonate compositions that have good processing and mechanical properties and good chemical resistance.

SUMMARY

Polycarbonate compositions having improved chemical resistance, good flow, and good impact properties including specific amounts of a polycarbonate; a poly(1,4-cyclohexanedimethylene terephthalate); a poly(carbonate-siloxane); a thermoplastic poly(ester-ether) copolymer, preferably comprising poly(butylene terephthalate) blocks and poly(oxy$C_1$-$C_4$ alkylene units); and an ethylene-alkyl acrylate copolymer, wherein alkyl is a $C_1$-$C_4$ straight chain, unsaturated hydrocarbon group; wherein the weight percentages are based on the total weight of the polymer composition are provided.

A polymer composition comprising: 15 to 60 weight percent (wt %), preferably 20 to 56 wt % of a polycarbonate; 30 to 60 wt %, preferably 28 to 50 wt % of a poly(1,4-cyclohexanedimethylene terephthalate); 0.05 to 35 wt %, preferably 0.1 to 30 wt % of a poly(carbonate-siloxane); 0.5 to 18 wt %, preferably 1 to 13 wt % of a thermoplastic poly(ester-ether) copolymer, preferably comprising poly(butylene terephthalate) blocks and poly(oxy$C_1$-$C_4$ alkylene units); and 0.5 to 8 wt % of ethylene-alkyl (meth)acrylate copolymer, wherein alkyl is a $C_1$-$C_4$ straight chain, unsaturated hydrocarbon group; wherein the weight percentages are based on the total weight of the polymer composition is provided.

An article molded from the polymer composition having a notched Izod impact strength greater than or equal to 650 Joules per meter (J/m), preferably greater than or equal to 700 J/m, more preferably greater than or equal to 710 J/m measured as per ASTM method D256 on a 3.2 millimeter (mm) thick sample; and a resistance to break of at least 4 days, preferably at least 5 days, measured as per ASTM D638 method at 50 millimeters per minute (mm/min) after exposure to sunscreen under 1% strain at 23° C. is provided. An article molded from the polymer composition having a melt volume rate of greater than 25, preferably greater than 28 cubic centimeters ($cm^3$)/10 minutes, measured as per ASTM method D1238 at 300° C. and 1.2 kilograms (kg); and a heat distortion temperature of 75 to 90° C., measured as per ASTM method D648 on a 3.2 mm bar at 1.82 MegaPascals (MPa) is provided.

Methods of forming the compositions and articles comprising the compositions are also described.

The above described and other features are exemplified by the following detailed description, examples, and claims.

DETAILED DESCRIPTION

The polycarbonates used in the formulations include homopolycarbonates and copolycarbonates having repeating structural carbonate units of the formula (1)

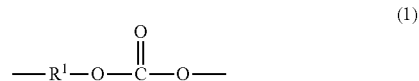

(1)

wherein at least 60 percent of the total number of $R^1$ groups are aromatic, or each $R^1$ contains at least one $C_{6-30}$ aromatic group. Polycarbonates and their methods of manufacture are known in the art, being described, for example, in WO 2013/175448 A1, US 2014/0295363, and WO 2014/072923. Polycarbonates and copolycarbonates are generally manufactured from bisphenol compounds such as 2,2-bis(4-hydroxyphenyl) propane ("bisphenol-A" or "BPA"), 3,3-bis(4-hydroxyphenyl)phthalimidine, 1,1-bis(4-hydroxy-3-methylphenyl)cyclohexane, or 1,1-bis(4-hydroxyphenyl)-3,3,5-trimethylcyclohexane (isophorone), or a combination comprising at least one of the foregoing bisphenol compounds can also be used. In a specific embodiment, the polycarbonate is a homopolymer derived from BPA; or a copolycarbonate derived from BPA and another bisphenol or dihydroxy aromatic compound such as resorcinol. In a specific embodiment the polycarbonate is a BPA homopolycarbonate.

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000 grams per mole (g/mol), specifically 20,000 to 100,000 g/mol, specifically 15,000 to 30,000 g/mol as measured by gel permeation chromatography (GPC), using a crosslinked styrene-divinylbenzene column and calibrated to bisphenol A homopolycarbonate references. GPC samples are prepared at a concentration of 1 milligram (mg) per milliliter (ml), and are eluted at a flow rate of 1.5 ml per minute.

In an embodiment, the polycarbonate has flow properties useful for the manufacture of thin articles. For example, the polycarbonate can have a melt volume ratio (MVR) of 5 to 150 cubic centimeters (cc)/10 minute (min), specifically 7 to 125 cc/10 min, more specifically 9 to 110 cc/10 min, and still more specifically 10 to 100 cc/10 min, measured at 300° C. and a load of 1.2 kilograms according to ASTM D1238-04. Combinations of polycarbonates of different flow properties can be used to achieve the overall desired flow property.

The composition further includes a poly(1,4-cyclohexanedimethylene terephthalate) (also known as PCT) having recurring units of formula (2)

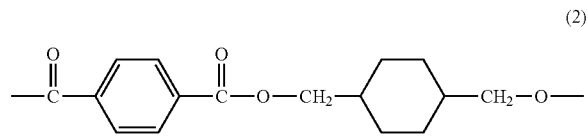
(2)

wherein the cyclohexane ring can be the cis-isomer, the trans-isomer, or a combination comprising at least one of the foregoing isomers. In some embodiments the PCT can have an intrinsic viscosity, as determined in chloroform at 25° C., of 0.3 to 1.5 deciliters per gram (dl/gm), specifically 0.45 to 1.0 dl/gm, and a weight average molecular weight of 10,000 to 200,000 Daltons, specifically 20,000 to 100,000 Daltons, as measured by gel permeation chromatography (GPC), using a crosslinked styrene-divinylbenzene column and calibrated to polystyrene standards.

A poly(carbonate-siloxane) copolymer is further present. Poly(carbonate-siloxane)s comprise carbonate units of formula (1) as described above, and repeating diorganosiloxane units of formula (3)

(3)

wherein each R is independently a $C_1$-$C_{13}$ monovalent organic group. For example, R can be a $C_1$-$C_{13}$ alkyl, $C_1$-$C_{13}$ alkoxy, $C_2$-$C_{13}$ alkenyl, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. Combinations of the foregoing R groups can be used in the same copolymer.

The value of E in formula (3) can vary widely depending on the type and relative amount of each component in the polycarbonate composition, the desired properties of the composition, and like considerations. Generally, E has an average value of 2 to 1,000, specifically 2 to 500, 2 to 200, or 2 to 125, 5 to 80, or 10 to 70. In an embodiment, E has an average value of 10 to 80 or 10 to 40, and in still another embodiment, E has an average value of 40 to 80, or 40 to 70. Where E is of a lower value, e.g., less than 40, it can be desirable to use a relatively larger amount of the poly(carbonate-siloxane) copolymer. Conversely, where E is of a higher value, e.g., greater than 40, a relatively lower amount of the poly(carbonate-siloxane) copolymer can be used.

In a preferred embodiment, R is methyl, or a combination of methyl and trifluoropropyl, or a combination of methyl and phenyl. A combination of a first and a second (or more) poly(carbonate-siloxane) copolymers can be used, wherein the average value of E of the first copolymer is less than the average value of E of the second copolymer.

In an embodiment, the polysiloxane blocks are of formula (11)

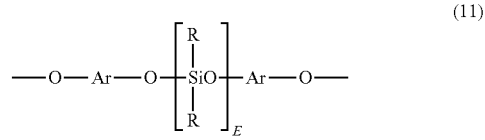
(11)

wherein E is as defined above; each R can be the same or different, and is as defined above; and Ar can be the same or different, and is a substituted or unsubstituted $C_6$-$C_{30}$ arylene, wherein the bonds are directly connected to an aromatic moiety. Ar groups in formula (11) can be derived from a $C_6$-$C_{30}$ dihydroxyarylene compound, for example, 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used.

In another embodiment, polysiloxane blocks are of formula (13)

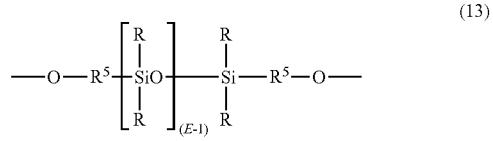
(13)

wherein R and E are as described above, and each $R^5$ is independently a divalent $C_1$-$C_{30}$ organic group, and wherein the polymerized polysiloxane unit is the reaction residue of its corresponding dihydroxy compound. In a specific embodiment, the polysiloxane blocks are of formula (14):

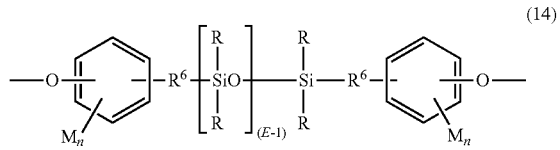
(14)

wherein R and E are as defined above. $R^6$ in formula (14) is a divalent $C_2$-$C_8$ aliphatic. Each M in formula (14) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In an embodiment, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_1$-$C_8$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl.

In still another embodiment, R is methyl, M is methoxy, n is one, $R^6$ is a divalent $C_1$-$C_3$ aliphatic group. Specific polysiloxane blocks are of the formulas

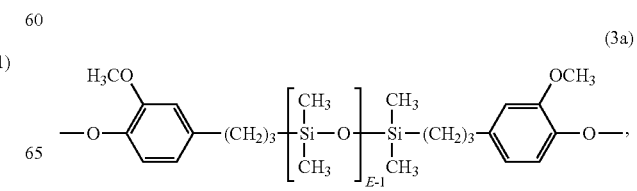
(3a)

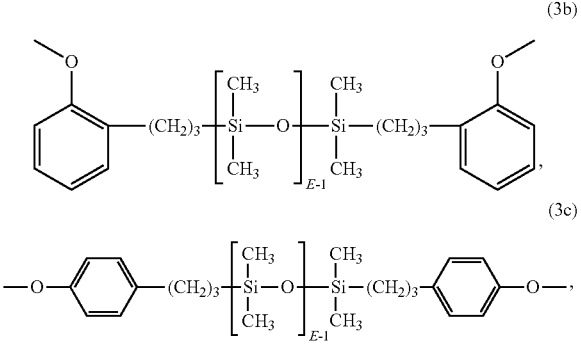

or a combination comprising at least one of the foregoing, wherein E has an average value of 2 to 200, 2 to 125, 5 to 125, 5 to 100, 5 to 50, 20 to 80, or 5 to 20. The poly (carbonate-siloxane) copolymer can comprise 10 to 30 wt % of polysiloxane units. Blocks of formula (3) can be derived from the corresponding dihydroxy polysiloxane, which in turn can be prepared effecting a platinum-catalyzed addition between the siloxane hydride and an aliphatically unsaturated monohydric phenol such as eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. The poly (carbonate-siloxane) copolymers can then be manufactured, for example, by the synthetic procedure of European Patent Application Publication No. 0 524 731 A1 of Hoover, page 5, Preparation 2. The transparent copolymers can be manufactured using one or both of the tube reactor processes described in U.S. Patent Application No. 2004/0039145A1 or the process described in U.S. Pat. No. 6,723,864 can be used to synthesize the poly(carbonate-siloxane) copolymers.

The poly(carbonate-siloxane) copolymers can comprise 50 to 99 weight percent of carbonate units and 1 to 50 weight percent siloxane units. Within this range, the polyorganosiloxane-polycarbonate copolymer can comprise 70 to 98 weight percent, more specifically 75 to 97 weight percent of carbonate units and 2 to 30 weight percent, more specifically 3 to 25 weight percent siloxane units.

In still another preferred embodiment, a poly(carbonate-siloxane) block copolymer of bisphenol A blocks and eugenol capped polydimethylsilioxane blocks, of the formula

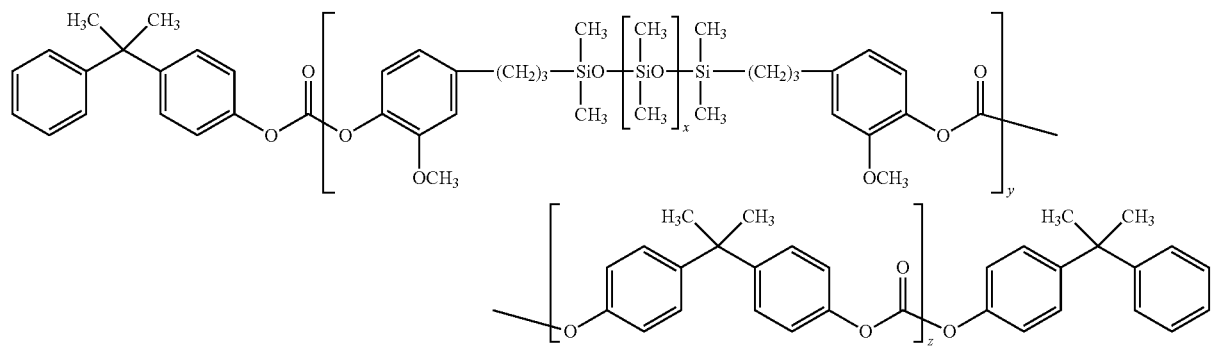

is used, wherein x is 1 to 200, specifically 5 to 85, specifically 10 to 70, specifically 15 to 65, and more specifically 40 to 60; x is 1 to 500, or 10 to 200, and z is 1 to 1000, or 10 to 800. In an embodiment, x is 1 to 200, y is 1 to 90 and z is 1 to 600, and in another embodiment, x is 30 to 50, y is 10 to 30 and z is 45 to 600. The polysiloxane blocks can be randomly distributed or controlled distributed among the polycarbonate blocks.

In an embodiment, the polycarbonate is a poly(carbonate-siloxane) copolymer comprising bisphenol A carbonate units and siloxane units, for example blocks containing 5 to 200 dimethylsiloxane units, such as those commercially available under the trade name EXL from SABIC. The poly (carbonate-siloxane) copolymer can comprise 10 wt % or more, specifically 12 wt % or more, and more specifically 14 wt % or more, of the polysiloxane copolymer based on the total weight of the poly(carbonate-siloxane) copolymer.

Polyorganosiloxane-polycarbonates can have a weight average molecular weight of 2,000 to 100,000 Daltons, specifically 5,000 to 50,000 Daltons as measured by gel permeation chromatography using a crosslinked styrene-divinyl benzene column, at a sample concentration of 1 milligram per milliliter, and as calibrated with polycarbonate standards. The polyorganosiloxane-polycarbonates can have a melt volume flow rate, measured at 300° C./1.2 kg, of 1 to 50 cubic centimeters per 10 minutes (cc/10 min), specifically 2 to 30 cc/10 min. Mixtures of polyorganosiloxane-polycarbonates of different flow properties can be used to achieve the overall desired flow property.

The thermoplastic poly(ester-ether) copolymer, also known in the art as thermoplastic elastomers or thermoplastic ester elastomers (TPEE) consist essentially of "soft block" long-chain ester units of formula (4)

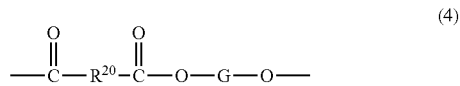

wherein G is a derived from a poly($C_1$-$C_4$ alkylene oxide) glycol having a number-average molecular weight of 400 to 6000, and $R^{20}$ is derived from a $C_4$-$C_{24}$ aliphatic or aromatic dicarboxylic acid, preferably an aromatic dicarboxylic acid; and "hard block" short-chain ester units of formula (5)

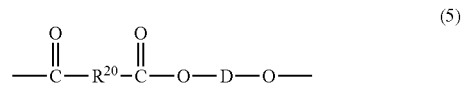

wherein D is a $C_1$-$C_{10}$ alkylene or cycloalkylene derived from the corresponding diol having a molecular weight of less than or equal to 300; and $R^{20}$ is derived from a $C_4$-$C_{24}$ aliphatic, alicyclic, or aromatic dicarboxylic acid, preferably an aromatic dicarboxylic acid; with the proviso that the short-chain ester units constitute about 40% to about 90% by weight of the poly(ether-ester) block copolymer, and the long-chain ester units constitute about 10% to about 60% by weight of the poly(ether-ester) block copolymer. The hard blocks are crystallizable materials that provide physical integrity, heat resistance, and chemical resistance, and the soft blocks provide elastomeric properties. In general, the melting point (Tm) of the hard block can be 120 to 200° C., or from 150 to 195° C., and glass transition temperature (Tg) of the soft block can be −25 to −85° C., or from −45 to −65° C. The hard block units of the poly(ether-ester) copolymers are derived from the reaction of a dicarboxylic acid component (which as used herein includes chemical equivalents thereof, for example acid chlorides) with a short chain $C_1$-$C_{10}$ aliphatic or alicyclic diol component (which as used herein includes chemical equivalents thereof, for example methyl esters).

In certain embodiments, the hard block units of the poly(ether-ester) copolymer are derived from a $C_6$-$C_{24}$ aromatic dicarboxylic acid. Examples of aromatic dicarboxylic acids include isophthalic acid, terephthalic acid, 1,2-di(p-carboxyphenyl)ethane, 4,4'-dicarboxydiphenyl ether, and 4,4'-bisbenzoic acid. Acids containing fused rings can also be present, such as in 1,4-, 1,5-, or 2,6-naphthalenedicarboxylic acids. Representative aromatic dicarboxylic acids include $C_6$ aromatic dicarboxylic acids. When the aromatic dicarboxylic acid component comprises terephthalic acid, isophthalic acid is present in an amount from 0 to 30 mole %, (e.g., 15 to 25 mole %), based on the total moles of isophthalic acid groups and terephthalic acid groups in the hard block units. In some embodiments, the aromatic hard block units comprise 70 to 100 mole % of terephthalic acid groups and 0 to 30 mole % of isophthalic acid groups.

In other embodiments, the hard block units of the poly(ether-ester) copolymer are derived from a $C_6$-$C_{30}$ alicyclic dicarboxylic acid. Examples of alicyclic dicarboxylic acids include the various isomers of 1,4-cyclohexane dicarboxylic acid (cis, trans, or a combination thereof), 1,4-cyclohexane dicarboxylic acid (cis, trans, or a combination thereof), 1,3-cyclohexane dicarboxylic acid (cis, trans, or a combination thereof), 1,2-cyclohexane dicarboxylic acid (cis, trans, or a combination thereof), and the various isomers of decalin dicarboxylic acid, norbornane dicarboxylic acid, adamantane dicarboxylic acid, and tricyclodecene-dicarboxylic acid.

The short chain $C_1$-$C_{10}$ diol component can comprise, for example, ethylene glycol, diethylene glycol, trimethylene glycol, 1,3-propane diol, 1,4-butane diol, or a combination comprising one or more of the foregoing $C_1$-$C_{10}$ diols. In some embodiments, 1,4-butane diol alone is used. In another embodiment, the short chain $C_1$-$C_{10}$ diol component comprises, in addition to 1,4-butanediol, diethylene glycol and ethylene glycol monomers that are added during the polymerization. The amount of such monomers can vary, depending on the application. For example, the diethylene glycol groups and ethylene glycol groups can be present in an amount of more than 0 to 5 wt % ethylene glycol and more than 0 to 5 wt % diethylene glycol. In certain embodiments, diethylene glycol is present in an amount from 0.02 to 2 wt %, based on the weight of the hard blocks.

Specific hard block units comprise, consist essentially of, or consist of ester units containing 1,4-butane diol groups, together with 70 to 100 mole % of terephthalic acid groups and 0 to 30 mole % of isophthalic acid groups, based on the total moles of hard block ester units.

The soft block units are formed by the reaction of a dicarboxylic acid component (which as used herein includes chemical equivalents thereof, for example acid chlorides) with a poly(oxyalkylene) diol component (which as used herein includes chemical equivalents thereof, for example methyl esters).

The dicarboxylic acid component used to manufacture the soft block units comprises one or more dicarboxylic acids. In certain embodiments, the dicarboxylic acids contain a $C_2$-$C_{30}$ alkylene group, a $C_6$-$C_{30}$ alicyclic group, a $C_6$-$C_{30}$ alkyl aromatic group, or a $C_6$-$C_{30}$ aromatic group. Examples of aromatic dicarboxylic acids include isophthalic acid, terephthalic acid, 1,2-di(p-carboxyphenyl)ethane, 4,4'-dicarboxydiphenyl ether, and 4,4'-bisbenzoic acid. Acids containing fused rings can also be present, such as in 1,4-, 1,5-, or 2,6-naphthalenedicarboxylic acids. Representative dicarboxylic acids include terephthalic acid, isophthalic acid, naphthalene dicarboxylic acid, and cyclohexane dicarboxylic acid. Terephthalic acid can be used alone, or in combination with isophthalic acid.

The poly(oxyalkylene) diol is a poly($C_1$-$C_4$ alkylene oxide) glycol having a number average molecular weight of 400 to 6000 Daltons, for example poly(oxytetramethylene) glycol (PTHF) derived from tetrahydrofuran. The poly(ether-ester) copolymers can comprise from 10 to 73 wt %, from 20 to 65 wt %, or from 40 to 60 wt %), of PTHF groups, based on the weight of the copolymer. It has been found that both transparency and good ductility are achieved when the PTHF groups have a molecular weight of 300 to 1800 Daltons; in certain embodiments, the poly(oxytetramethylene) glycol groups have a molecular weight from 700 to 1700 Daltons or from 900 to 1600 Daltons.

A variety of poly(ether-ester) copolymers are commercially available, for example under the trademarks ARNITEL EM400 and ARNITEL EL630 poly(ether-ester) copolymers from DSM; HYTREL 3078, HYTREL 4056, HYTREL 4556, and HYTREL 6356 poly(ether-ester) copolymers from DuPont; and ECDEL 9966 poly(ether-ester) copolymer from Eastman Chemical. In all cases, the soft block is derived from tetrahydrofuran. In the HYTREL 4556, HYTREL 6356, ARNITEL EM400, and ARNITEL EL630 poly(ether-ester) copolymers, the hard block is based on poly(butylene terephthalate) (PBT). In the HYTREL 4056 poly(ester-ether) copolymer, the hard block contains isophthalate units in addition to terephthalate units. In the ECDEL 9966 poly(ether-ester) copolymer, the hard block is based on poly(1,4-cyclohexane-dimethanol-1,4-cyclohexane dicarboxylate) (PCCD) units.

The ethylene-alkyl (meth)acrylate copolymer comprises units derived from ethylene and from a straight chain ($C_1$-$C_4$) alkyl (meth)acrylate, i.e., an acrylate or methacrylate. The ethylene-alkyl (meth)acrylate copolymer can be an ethylene-methyl acrylate copolymer or ethylene-ethyl acrylate copolymer, or a combination comprising at least one of the foregoing. The ethylene-methyl acrylate copolymer or ethylene-ethyl acrylate copolymer can have an acrylate content of 15 to 30 wt %, preferably 18 to 28 wt %.

The polycarbonate compositions can further comprise an additive composition comprising one or more additives selected to achieve a desired property, with the proviso that each additive is also selected so as to not significantly adversely affect a desired property of the polycarbonate composition. The additive composition or individual additives can be mixed at a suitable time during the mixing of the components for forming the composition. The additive can be soluble or non-soluble in polycarbonate. The additive composition can include a filler (e.g., a particulate polytetrafluoroethylene (PTFE), glass, carbon, mineral, or metal), an antioxidant, a thermal stabilizer, a quencher, a colorant (e.g, a dye or pigment), a mold release agent, a light stabilizer, an ultraviolet light absorber, a plasticizer, a lubricant, an antistatic agent, a flame retardant, an anti-drip agent (e.g., a PTFE-encapsulated styrene-acrylonitrile copolymer (TSAN)), or a combination comprising one or more of the foregoing. For example, a combination of a quencher, a mold release agent, and one or more antioxidants can be used. In general, the additives are used in the amounts generally known to be effective. For example, the total amount of the additive composition can be 0.001 to 10.0 wt %, or 0.01 to 5 wt %, or 0.001 to 0.5 wt %, or 0.005 to 0.1 wt % each based on the total weight of the polymer in the composition.

In an embodiment, the additive composition comprises a quencher, a mold release agent, and one or more antioxidants.

The polycarbonate compositions can be manufactured by various methods known in the art. For example, powdered polycarbonate, and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming The above-described combination of components, in the recited amounts, can provide excellent properties, in particular chemical resistance. In some embodiments the compositions can further have excellent flow, excellent impact properties, or both.

For example, an article molded from the polymer composition can have a notched Izod impact strength greater than or equal to 650 J/m, preferably greater than or equal to 700 J/m, more preferably greater than or equal to 710 J/m measured as per ASTM method D256 on a 3.2 millimeter (mm) thick sample.

An article molded from the polymer composition can have a resistance to break of at least 4 days, preferably at least 5 days, measured as per ASTM D638 method at 50 mm/min after exposure to sunscreen under 1% strain at 23° C.

An article molded from the polymer composition can have a melt volume rate of greater than 25, preferably greater than 28 cm3/10 minutes, measured as per ASTM method D1238 at 300° C. and 1.2 kilograms.

An article molded from the polymer composition can have a heat distortion temperature of 75 to 90° C., measured as per ASTM method D648 on a 3.2 mm bar at 1.82 MPa.

The polymer compositions are further illustrated by the following non-limiting examples.

EXAMPLES

The materials used in the Examples are shown in Table 1.

TABLE 1

Materials Used

| Material | Description | Source |
| --- | --- | --- |
| PC | Bisphenol A polycarbonate homopolymer; Mw = 15000-30000 Daltons (Bisphenol A homopolycarbonate standards) | SABIC |
| PC-Si | Poly(bisphenol A carbonate-dimethylsiloxane) copolymer (20 wt % siloxane); (EXL) | SABIC |
| PCT | Poly(1,4-cyclohexanemethylene) terephthalate | Celanese |
| TPEE | Poly(butylene tere/isophthalate-co-polyoxybutylene) | DuPont |
| EMA | Ethylene-methyl acrylate copolymer (Elvaloy 1125AC) | DuPont |
| EEA | Ethylene-ethyl acrylate copolymer (AMPLIFY* EA 102) | Dow |
| PBT | Poly(butylene terephthalate) | Chang Chun Plastics |
| BPADP | Bisphenol A bis-(diphenyl phosphate) | Daihachi Chemical |
| Antioxidant-1 | Tetrakis(methylene(3,5-di-tert-butyl-4-hydroxy-hydroxinnamate)methane (Antioxidant 1010) | BASF |
| Quencher | Phosphorous acid 45% | Sinopharm Chemical Reagent |
| Antioxidant-2 | Phosphonous acid ester powder (Hostanox P-EPQ) | Clariant |

Processing: Typical compounding procedures are described as follows. All the ingredients were pre-blended, and then extruded using a twin extruder. The composition was melt-kneaded and extruded. The extrudate was cooled through a water bath prior to pelletizing. A typical example of an extruding condition is listed in Table 2.

TABLE 2

Extrusion Conditions

| Parameters | | |
| --- | --- | --- |
| Zone 1 Temp | ° C. | 50 |
| Zone 2 Temp | ° C. | 100 |
| Zone 3 Temp | ° C. | 270 |
| Zone 4 Temp | ° C. | 270 |
| Zone 5 Temp | ° C. | 270 |
| Zone 6 Temp | ° C. | 270 |
| Zone 7 Temp | ° C. | 270 |
| Zone 8 Temp | ° C. | 270 |
| Zone 9 Temp | ° C. | 270 |
| Zone 10 Temp | ° C. | 270 |
| Zone 11 Temp | ° C. | 270 |
| Die Temp | ° C. | 270 |
| Die | millimeters (mm) | 3 |
| Screw speed | revolutions per minute (rpm) | 400 |
| Throughput | kilograms per hour (kg/hr) | 40 |

Sample preparation and testing: After drying the obtained pellets at 100° C. for 4 hours, all the testing specimens in accordance with ASTM standards were prepared from the pellets using a 150 T injection molding machine at a melt temperature 295° C. and at a mold temperature of 75° C. (see Table 3 for parameters used).

TABLE 3

Molding Parameters

| Parameters | Units | |
|---|---|---|
| CND*: Pre-drying time | Hours | 4 |
| CND*: Pre-drying temp | ° C. | 100 |
| Hopper temp | ° C. | 50 |
| Zone 1 temp | ° C. | 285 |
| Zone 2 temp | ° C. | 295 |
| Zone 3 temp | ° C. | 295 |
| Nozzle temp | ° C. | 290 |
| Mold temp | ° C. | 75 |
| Screw speed | Revolutions per minute (rpm) | 100 |
| Back pressure | Kilogram force per centimeter squared (kgf/cm²) | 68 |
| Molding Machine | | Faunc |
| Mold Type (insert) | | ASTM |

*CND—Conditioning

The samples were tested for various properties using the standards shown in Table 4. Unless otherwise specified, all test methods are those in effect as of the filing date of this application.

TABLE 4

Testing Procedures

| Property | Standard | Conditions | Specimen Type | Units |
|---|---|---|---|---|
| Melt volume Rate (MVR) | ASTM D1238 | 300° C., 1.2 Kilograms (kG) | Granule | cm³/10 mins |
| Tensile Strength | ASTM D638 | 50 mm/min | Tensile Type I Bar, gage length 50 millimeters (mm) | Mega Pascal (MPa) |
| Notched Izod Impact (NII) | ASTM D256 | from −40 to about 23° C. | Bar 63.5 × 12.7 × 3.2 mm | Joule per meter (J/m) |
| Heat distortion temperature (HDT) | ASTM D648 | 1.82 MPa | Bar 63.5 × 12.7 × 3.2 mm | ° C. |

In addition, chemical resistance was measured by crack of Tensile Stress per ASTM D 638 using injection molded tensile bars. The bars were clamped to a semicircular jig to impart a constant applied strain of 1.0%. The strained bars were exposed to the sunscreen (SPF30) until they cracked. At least four tensile bars of each formulation were tested for the chemical exposure test. A test result of number 5 means the sample did not crack for 5 days (excellent), number 3 means the sample did not crack for at least three days (good), number 1 means the sample cracks in less than one day (poor).

Low temperature ductility is reported as the temperature at which the material still maintain ductility.

Table 5 shows the compositions (wt %) and properties of the various examples and comparative examples. In addition to the components shown in Table 5, each composition was formulated with 0.01 wt % $H_3PO_3$ quencher, 0.15 wt % Antioxidant-2, and 0.12 wt % of Antioxidant-1. Any total of the components for each composition that does not equal 100% is due to rounding of the amounts.

TABLE 5

Examples and Properties

| Component | CF-1* | CF-2* | C1 | C2 | C3 | C4 | C5 | C6 | C7 | E8 | E9 | E10 | E11 |
|---|---|---|---|---|---|---|---|---|---|---|---|---|---|
| PC | 45.22 | 82.5 | 50 | 44 | 34 | 33 | 57 | 42 | 37 | 42 | 39 | 37 | 42 |
| PCT | | | 30 | 30 | 30 | 30 | 30 | 25 | 25 | 30 | 30 | 30 | 30 |
| PBT | 20 | | | | | | | | | | | | |
| PC-Si | 25 | 17.5 | 20 | 20 | 20 | 20 | | 20 | 25 | 15 | 20 | 20 | 15 |
| TPEE | | | | 5 | 15 | 10 | 10 | 10 | 10 | 10 | 10 | 10 | 10 |
| EMA | | | | | | 6 | 2 | 2 | 2 | 2 | | 2 | |
| EEA | | | | | | | | | | | | | 2 |
| BPADP | 8.5 | | | | | | | | | | | | |
| Properties | | | | | | | | | | | | | |
| MVR, cm³/10 min | 26 | | 23.8 | 25.5 | 31.8 | 27.5 | 36.9 | 27.1 | 25 | 28.9 | 29.6 | 26 | 29.2 |
| HDT, ° C. | | 124 | 104 | 87.8 | 75.2 | 81 | 82.8 | 82.9 | 83.1 | 78.8 | 81.2 | 83.8 | 79.9 |
| Low temperature ductility, ° C. | 23 | −40 | −20 | 0 | −20 | −20 | 23 | −20 | −40 | −10 | 0 | −20 | −10 |
| Impact Strength: 23° C., J/m | 550 | 877 | 813 | 758 | 728 | 742 | 737 | 743 | 727 | 752 | 730 | 769 | 710 |
| Chemical resistance | 3 | 3 | 1 | 2 | 4 | 5 | 1 | 1 | 1 | 5 | 4 | 5 | 5 |

*Comparative

It can be seen from the example data for E9-E11 in Table 5 that poly(carbonate-siloxane)s in combination with thermoplastic polyester (PCT), thermoplastic polyester elastomer (TPEE) and ethylene-methyl acrylate copolymer (EMA) or ethylene-ethyl acrylate copolymer (EEA) provides excellent chemical resistance to polycarbonate compositions. By using the poly(carbonate-siloxane as impact modifier, the composition showed good impact strength (NII>700 J/m at room temperature) and low temperature ductility.

In contrast, when PCT loading was decreased to 25 wt % (see sample C6), even an increased polycarbonate-siloxane loading (see sample C7) did not provide good chemical resistance. When TPEE loading was decreased to 5 wt % (see sample C2), the composition did not provide good chemical resistance. When EMA (see sample C8) is replaced with EEA (see sample E11), the compositions show similar chemical resistance performance.

The polymer composition, articles prepared therefrom, and methods of manufacturing are further illustrated by the following embodiments, which are non-limiting.

Embodiment 1

A polymer composition comprising: 15 to 60 wt %, preferably 20 to 56 wt % of a polycarbonate; 30 to 60 wt %, preferably 28 to 50 wt % of a poly(1,4-cyclohexanedimethylene terephthalate); 0.05 to 35 wt %, preferably 0.1 to 30 wt % of a poly(carbonate-siloxane); 0.5 to 18 wt %, preferably 1 to 13 wt % of a thermoplastic poly(ester-ether) copolymer, preferably comprising poly(butylene terephthalate) blocks and poly(oxyC$_1$-C$_4$ alkylene units); and 0.5 to 8 wt % of ethylene-alkyl (meth)acrylate copolymer, wherein alkyl is a C$_1$-C$_4$ straight chain, unsaturated hydrocarbon group; wherein the weight percentages are based on the total weight of the polymer composition.

Embodiment 2

The composition of embodiment 1, wherein an article molded from the polymer composition has a notched Izod impact strength greater than or equal to 650 J/m, preferably greater than or equal to 700 J/m, more preferably greater than or equal to 710 J/m measured as per ASTM method D256 on a 3.2 millimeter (mm) thick sample; and a resistance to break of at least 4 days, preferably at least 5 days, measured as per ASTM D638 method at 50 mm/min after exposure to sunscreen under 1% strain at 23° C.

Embodiment 3

The composition of embodiments 1 or 2, wherein an article molded from the polymer composition has a melt volume rate of greater than 25, preferably greater than 28 cm$^3$/10 minutes, measured as per ASTM method D1238 at 300° C. and 1.2 kilograms; and a heat distortion temperature of 75 to 90° C., measured as per ASTM method D648 on a 3.2 mm bar at 1.82 MPa.

Embodiment 4

The composition of any one or more of embodiments 1 to 3, wherein the ethylene-alkyl (meth)acrylate copolymer is ethylene-methyl acrylate copolymer or ethylene-ethyl acrylate copolymer, or a combination comprising at least one of the foregoing.

Embodiment 5

The composition of embodiment 4, wherein the ethylene-methyl acrylate copolymer or ethylene-ethyl acrylate copolymer has an acrylate content of 15 to 30 wt %, preferably 18 to 28 wt %.

Embodiment 6

The composition of any one or more of embodiments 1 to 5, wherein the thermoplastic poly(ester-ether) copolymer comprises 40 to 90 wt %, preferably 25 to 75 wt % of a hard block comprising polybutylene terephthalate repeating units having an average molecular weight less than 250 g/mol and 60 to 90 wt %, preferably 75 to 25 wt % of polyoxyalkylene units having a number average molecular weight less of 400 to 6000 g/mole.

Embodiment 7

The composition of any one or more of embodiments 1 to 6, wherein the polycarbonate is a bisphenol-A polycarbonate having a weight average molecular weight between 15,000 and 30,000 g/mol.

Embodiment 8

The composition of any one or more of embodiments 1 to 7, wherein the poly(carbonate-siloxane) copolymer comprises 10 to 30 wt % of polysiloxane units.

Embodiment 9

The composition of any one or more of embodiments 1 to 8, wherein the poly(carbonate-siloxane) copolymer comprises the formula:

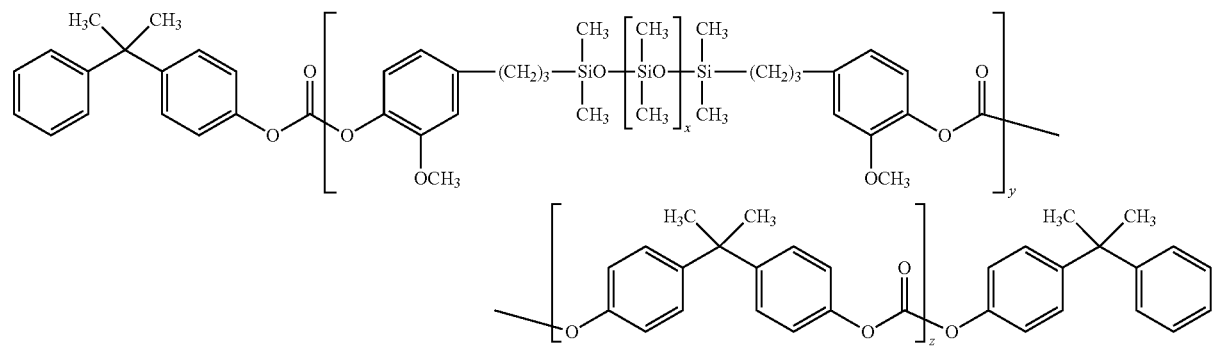

wherein x is 1 to 200, y is 1 to 90 and z is 1 to 600.

Embodiment 10

The composition of any one or more of embodiments 1 to 9, further comprising a filler, an antioxidant, a thermal stabilizer, a quencher, a colorant, a mold release agent, a light stabilizer, an ultraviolet light absorber, a plasticizer, a lubricant, an antistatic agent, a flame retardant, an anti-drip agent, or a combination comprising at least one of the foregoing.

Embodiment 11

The composition of any one or more of embodiments 1 to 10, comprising 32 to 47 wt % polycarbonate, preferably a bisphenol A homopolycarbonate; 25 to 35 wt % polyester, preferably poly(1,4-cyclohexanedimethylene terephthalate); 10 to 25 wt % poly(carbonate-siloxane), preferably of the formula

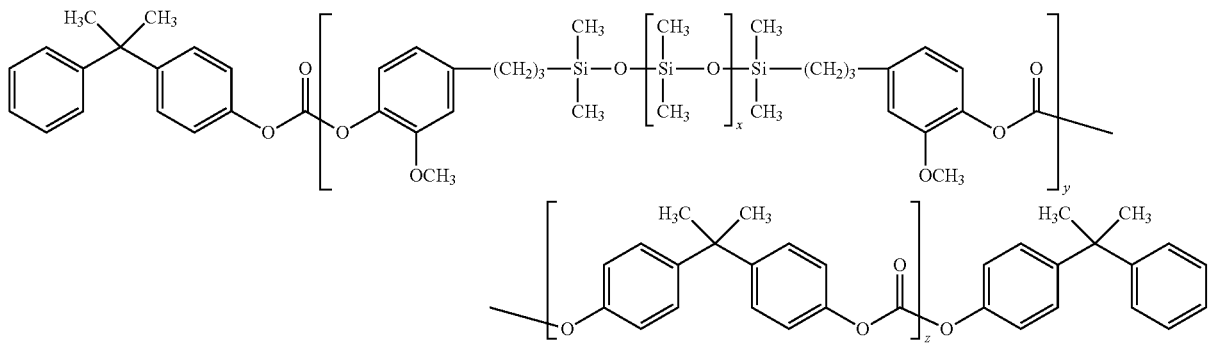

wherein x is 1 to 200, y is 1 to 90 and z is 1 to 600; 5 to 15 wt % thermoplastic poly(ether-ester), preferably comprising poly(butylene terephthalate/isophthalate) blocks and poly($C_1$-$C_4$ oxytetramethylene terephthalate) blocks; 1 to 3 wt % ethylene-methyl acrylate copolymer or ethylene-ethyl acrylate copolymer or a combination comprising at least one of the foregoing; 0.005 to 0.1 wt % quencher; 0.005 to 0.1 wt % mold release agent; and 0.1 to 0.2 wt % of one or more antioxidants.

Embodiment 12

A method of preparing a polymer composition, comprising: melt blending the components of the polymer composition of embodiment 1.

Embodiment 13

An article comprising the polymer composition of any of embodiments 1 to 11.

Embodiment 14

The article of claim 13, wherein the article is a sheet, a film, a multilayer sheet, a multilayer film, a molded part, an extruded profile, a fiber, a coated part, or a foam.

Embodiment 15

The article of embodiment 13 or 14, having a notched Izod impact strength greater than or equal to 650 J/m, preferably greater than or equal to 700 J/m, more preferably greater than or equal to 710 J/m measured as per ASTM method D256 on a 3.2 millimeter (mm) thick sample; and a resistance to break of at least 4 days, preferably at least 5 days, measured as per ASTM D638 method at 50 mm/min after exposure to sunscreen under 1% strain at 23° C.

Embodiment 16

The article of any one or more of embodiments 13 to 15, having a melt volume rate of greater than 25, preferably greater than 28 $cm^3$/10 minutes, measured as per ASTM method D1238 at 300° C. and 1.2 kilograms; and a heat distortion temperature of between 75-90° C., measured as per ASTM method D648 on a 3.2 mm bar at 1.82 MPa.

In general, the invention may alternatively comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or" unless clearly stated otherwise. It is to be understood that the described elements may be combined in any suitable manner in the various embodiments. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. The suffix "(s)" is intended to include both the singular and the plural of the term that it modifies, thereby including at least one of that term (e.g., the colorant(s) includes at least one colorants). Unless defined otherwise, technical and scientific terms used herein have the same meaning as is commonly understood by one of skill in the art to which this disclosure belongs. A "combination" is inclusive of blends, mixtures, reaction products, and the like.

The term "alkyl" includes branched or straight chain, unsaturated aliphatic $C_1$-$C_{30}$ hydrocarbon groups e.g., methyl, ethyl, n-propyl, i-propyl, n-butyl, s-butyl, t-butyl, n-pentyl, s-pentyl, n- and s-hexyl, n- and s-heptyl, and, n- and s-octyl. "Alkenyl" means a straight or branched chain, monovalent hydrocarbon group having at least one carbon-carbon double bond (e.g., ethenyl (—HC═$CH_2$)). "Alkenyloxy" means an alkenyl group that is linked via an oxygen (i.e., alkenyl-O—). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—$CH_2$—) or propylene (—$(CH_2)_3$—)). "Cycloalkyl" means a non-aromatic monovalent monocyclic or multicylic hydrocarbon group having at least three carbon atoms. "Cycloalkoxy" means a cycloalkyl group that is linked via an oxygen (i.e., cycloalkyl-O—). "Aryl" means an aromatic monovalent group containing only carbon in the aromatic ring or rings. "Arylene" refers to an aromatic divalent group containing only carbon in the aromatic ring or rings. "Aryloxy" or "aralkoxy" means an aryl group as defined above with the indicated number of carbon atoms attached through an oxygen bridge (—O—). "Alkylaryloxy" means an aryloxy group as defined above, where the aryl group is substituted with an alkyl group. "Alkylaryl" means an aryl group as defined above, where the aryl group is substituted with an alkyl group. "Arylalkyl" or "aralkyl" means an alkyl group that has been substituted with an aryl group, with benzyl being an exemplary arylalkyl group. "Acyl" refers to an alkyl group as defined above with the indicated number of carbon atoms attached through a carbonyl carbon bridge (—C(=O)—). "Cycloalkylene" means a divalent cyclic alkylene group, —$C_nH_{2n-x}$, wherein x is the number of hydrogens replaced by cyclization(s). The prefix "halo" means a group or compound including one more of a fluoro, chloro, bromo, iodo, and astatino substituent. A combination of different halo groups (e.g., bromo and fluoro) can be present. In an embodiment only chloro groups are present. The prefix "hetero" means that the compound or group includes at least one ring member that is a heteroatom (e.g., 1, 2, or 3 heteroatom(s)), wherein the heteroatom(s) is each independently N, O, S, or P. "Substituted" means that the compound or group is substituted with at least one (e.g., 1, 2, 3, or 4) substituents independently selected from a $C_1$-$C_9$ alkoxy, a $C_1$-$C_9$ haloalkoxy, a nitro (—$NO_2$), a cyano (—CN), a $C_1$-$C_6$ alkyl sulfonyl (—S(=O)$_2$-alkyl), a $C_6$-$C_{12}$ aryl sulfonyl (—S(=O)$_2$-aryl) a thiol (—SH), a thiocyano (—SCN), a tosyl ($CH_3C_6H_4SO_2$—), a $C_3$-$C_{12}$ cycloalkyl, a $C_2$-$C_{12}$ alkenyl, a $C_5$-$C_{12}$ cycloalkenyl, a $C_6$-$C_{12}$ aryl, a $C_7$-$C_{13}$ arylalkylene, a $C_4$-$C_{12}$ heterocycloalkyl, and a $C_3$-$C_{12}$ heteroaryl instead of hydrogen, provided that the substituted atom's normal valence is not exceeded.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A polymer composition comprising:
   15 to 60 wt % of a polycarbonate;
   30 to 60 wt % of a poly(1,4-cyclohexanedimethylene terephthalate);
   0.05 to 35 wt % of a poly(carbonate-siloxane);
   0.5 to 18 wt % of a thermoplastic poly(ester-ether) copolymer; and
   0.5 to 8 wt % of an ethylene-alkyl (meth)acrylate copolymer, wherein alkyl is a $C_1$-$C_4$ straight chain, unsaturated hydrocarbon group;
   wherein the weight percentages are based on the total weight of the polymer composition.

2. The composition of claim 1, wherein an article molded from the polymer composition has
   a notched Izod impact strength greater than or equal to 650 J/m measured as per ASTM method D256 on a 3.2 millimeter (mm) thick sample; and
   a resistance to break of at least 4 days measured as per ASTM D638 method at 50 mm/min after exposure to sunscreen under 1% strain at 23° C.

3. The composition of claim 1, wherein an article molded from the polymer composition has
   a melt volume rate of greater than 25 cm³/10 minutes, measured as per ASTM method D1238 at 300° C. and 1.2 kilograms; and
   a heat distortion temperature of 75 to 90° C., measured as per ASTM method D648 on a 3.2 mm bar at 1.82 MPa.

4. The composition of claim 1, wherein the ethylene-alkyl (meth)acrylate copolymer is ethylene-methyl acrylate copolymer or ethylene-ethyl acrylate copolymer, or a combination comprising at least one of the foregoing.

5. The composition of claim 4, wherein the ethylene-methyl acrylate copolymer or ethylene-ethyl acrylate copolymer has an acrylate content of 15 to 30 wt %.

6. The composition of claim 1, wherein the thermoplastic poly(ester-ether) copolymer comprises 40 to 90 wt % of a hard block comprising polybutylene terephthalate repeating units having an average molecular weight less than 250 g/mol and 60 to 90 wt % of polyoxyalkylene units having a number average molecular weight less of 400 to 6000 g/mole.

7. The composition of claim 1, wherein the polycarbonate is a bisphenol-A polycarbonate having a weight average molecular weight between 15,000 and 30,000 g/mol.

8. The composition of claim 1, wherein the poly(carbonate-siloxane) copolymer comprises 10 to 30 wt % of polysiloxane units.

9. The composition of claim 1, wherein the poly(carbonate-siloxane) copolymer comprises the formula:

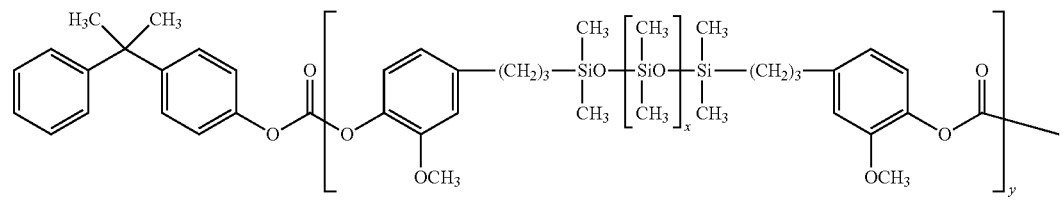

-continued

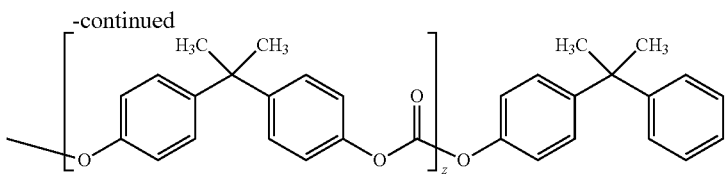

wherein x is 1 to 200, y is 1 to 90 and z is 1 to 600.

10. The composition of claim 1, further comprising a filler, an antioxidant, a thermal stabilizer, a quencher, a colorant, a mold release agent, a light stabilizer, an ultraviolet light absorber, a plasticizer, a lubricant, an antistatic agent, a flame retardant, an anti-drip agent, or a combination comprising at least one of the foregoing.

11. The composition of claim 1, comprising
32 to 47 wt % of the polycarbonate;
25 to 35 wt % of the polyester;
10 to 25 wt % of the poly(carbonate-siloxane)
5 to 15 wt % of the thermoplastic poly(ether-ester);
1 to 3 wt % of the ethylene-alkyl (meth)acrylate copolymer which comprises an ethylene-methyl acrylate copolymer or an ethylene-ethyl acrylate copolymer or a combination comprising at least one of the foregoing;
0.005 to 0.1 wt % of a quencher;
0.005 to 0.1 wt % of a mold release agent; and
0.1 to 0.2 wt % of one or more antioxidants.

12. A method of preparing a polymer composition, comprising:
melt blending the components of the polymer composition of claim 1.

13. An article comprising the polymer composition of claim 1.

14. The article of claim 13, wherein the article is a sheet, a film, a multilayer sheet, a multilayer film, a molded part, an extruded profile, a fiber, a coated part, or a foam.

15. The article of claim 13, having a notched Izod impact strength greater than or equal to 650 J/m measured as per ASTM method D256 on a 3.2 millimeter (mm) thick sample; and a resistance to break of at least 4 days measured as per ASTM D638 method at 50 mm/min after exposure to sunscreen under 1% strain at 23° C.

16. The article of claim 13, having
a melt volume rate of greater than 25 cm$^3$/10 minutes, measured as per ASTM method D1238 at 300° C. and 1.2 kilograms; and
a heat distortion temperature of between 75-90° C., measured as per ASTM method D648 on a 3.2 mm bar at 1.82 MPa.

17. The polymer composition of claim 1, comprising:
20 to 56 wt % of the polycarbonate;
28 to 50 wt % of the poly(1,4-cyclohexanedimethylene terephthalate);
0.1 to 30 wt % of the poly(carbonate-siloxane);
1 to 13 wt % of the thermoplastic poly(ester-ether) copolymer; and
0.5 to 8 wt % of the ethylene-alkyl (meth)acrylate copolymer;
wherein the weight percentages are based on the total weight of the polymer composition.

18. The composition of claim 6, wherein the thermoplastic poly(ester-ether) copolymer comprises 25 to 75% of the hard block comprising the polybutylene terephthalate repeating units and 75 to 25 wt % of the polyoxyalkylene units.

19. The composition of claim 11, wherein:
the polycarbonate is a bisphenol A homopolycarbonate;
the polyester is poly(1,4-cyclohexanedimethylene terephthalate);
the poly(carbonate-siloxane) is of the formula

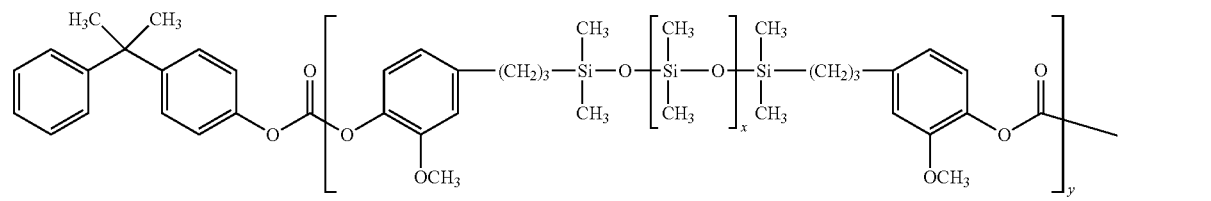

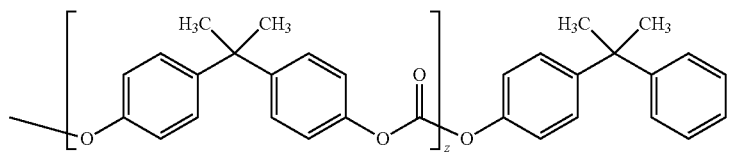

wherein x is 1 to 200, y is 1 to 90 and z is 1 to 600; and
the thermoplastic poly(ether-ester) comprises poly(butylene terephthalate/isophthalate) blocks and poly($C_1$-$C_4$ oxytetramethylene terephthalate) blocks.

* * * * *